United States Patent
Grover et al.

(10) Patent No.: US 9,952,843 B2
(45) Date of Patent: Apr. 24, 2018

(54) PARTIAL PROGRAM SPECIALIZATION AT RUNTIME

(71) Applicant: NVIDIA Corporation, Santa Clara, CA (US)

(72) Inventors: Vinod Grover, Mercer Island, WA (US); Thibaut Lutz, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 202 days.

(21) Appl. No.: 14/714,054

(22) Filed: May 15, 2015

(65) Prior Publication Data

US 2015/0331700 A1  Nov. 19, 2015

Related U.S. Application Data

(60) Provisional application No. 61/993,993, filed on May 15, 2014.

(51) Int. Cl.
*G06F 9/44* (2006.01)
*G06F 9/45* (2006.01)
*G06F 9/455* (2018.01)
*G06F 9/445* (2018.01)

(52) U.S. Cl.
CPC .............. *G06F 8/49* (2013.01); *G06F 8/42* (2013.01); *G06F 8/443* (2013.01); *G06F 9/445* (2013.01); *G06F 9/45516* (2013.01)

(58) Field of Classification Search
None
See application file for complete search history.

(56) References Cited

U.S. PATENT DOCUMENTS

| | | | | |
|---|---|---|---|---|
| 6,199,201 B1* | 3/2001 | Lamping | ............ | G06F 8/49 717/114 |
| 6,427,231 B1* | 7/2002 | Burke | ............ | G06F 9/443 712/E9.082 |
| 6,427,234 B1* | 7/2002 | Chambers | ............ | G06F 9/45516 717/140 |
| 6,745,384 B1* | 6/2004 | Biggerstaff | ............ | G06F 8/4441 712/203 |
| 8,683,454 B1* | 3/2014 | Muggli | ............ | G06F 8/4435 717/159 |
| 2004/0015830 A1* | 1/2004 | Reps | ............ | G06F 17/10 717/104 |
| 2004/0250237 A1* | 12/2004 | Simonyi | ............ | G06F 8/33 717/105 |
| 2007/0061787 A1* | 3/2007 | Trowbridge | ............ | G06F 8/44 717/140 |
| 2009/0077543 A1* | 3/2009 | Siskind | ............ | G06F 8/447 717/136 |
| 2010/0095284 A1* | 4/2010 | Herring | ............ | G06F 9/4552 717/148 |

(Continued)

*Primary Examiner* — Insun Kang

(57) ABSTRACT

A solution is proposed for implementing staging in computer programs and code specialization at runtime. Even when values are not known at compile time, many of the values used as parameters for a code section or a function are constant, and are known prior to starting the computation of the algorithm. Embodiments of the claimed subject matter propagate these values just before execution in the same way a compiler would if they were compile time constant, resulting in improved control flow and significant simplification in the computation involved.

20 Claims, 6 Drawing Sheets

(56) References Cited

U.S. PATENT DOCUMENTS

| | | | | |
|---|---|---|---|---|
| 2011/0072419 A1* | 3/2011 | Archambault | G06F 8/43 | 717/146 |
| 2012/0159459 A1* | 6/2012 | Turner | G06F 8/314 | 717/138 |
| 2012/0324430 A1* | 12/2012 | Agarwal | G06F 9/44536 | 717/151 |
| 2014/0019949 A1* | 1/2014 | Craymer | G06F 8/443 | 717/150 |
| 2014/0082597 A1* | 3/2014 | Chafi | G06F 8/443 | 717/148 |
| 2014/0137078 A1* | 5/2014 | Agha | G06F 9/45516 | 717/114 |
| 2014/0173556 A1* | 6/2014 | Robatmili | G06F 9/45529 | 717/115 |
| 2014/0189661 A1* | 7/2014 | Wuerthinger | G06F 9/4552 | 717/139 |
| 2014/0223415 A1* | 8/2014 | van Gogh | G06F 8/75 | 717/123 |
| 2015/0277861 A1* | 10/2015 | Jennings | G06F 8/41 | 717/148 |

\* cited by examiner

```
struct B { float a; double b; };
struct A{ int a; int *b; char c; B s; };

int foo (int i, A a){
    int acu = *a.b;
    for (int i = 0; j < a.a; ++i)
        for(int j = 0; j < a.c; ++j)
            ++acu;
    return i + acu + (int)a.s.a * (int)a.s.b;
} int main(){
    int i;
    A a;
    // dynamically initialize i such that
    // i = 12;
    // a = {2,&I,6,{3,4}};
    auto specialized_foo = Specialize(foo, i, a);
    return specialized_foo(i, a);
}
```

```
define i32 @_Z3foo1lA(i32 %i,
%struct.A* byval align 8 %a, i32 %x) {
  %0 = getelementptr %struct.A* %a, i32 0, i32 1
  %1 = load i32** %0, align 8
  %2 = load i32* %1, align 4
  %3 = add i32 %2, 36
  ret i32 %4
}
```

```
struct B { float a; double b; };
struct A { int a; int *b; char c; B s; };

int main(){
    int i;
    A a;
    // dynamically initialize 'i' and 'a' such that
    // i = 12;
    // a = {2,&I,6,{3,4}};
    auto lambda = [i, a](int x){
        int acu = *a.b;
        for(int i = 0; i < a.a; ++i)
            for(int j = 0; j < a.c; ++j)
                ++acu, ++x;
        return x + i + acu + (int)a.s.a * (int)a.s.b;
    };
    int r1 = lambda(10); // returns 70
    int r2 = lambda(0);  // returns 60
}
```

PARTIAL PROGRAM SPECIALIZATION AT RUNTIME

RELATED APPLICATIONS

This application claims the benefit of U.S. Provisional Patent Application No. 61/993,993, entitled "Binding Time Analysis for Staging and Runtime Specialization," also by Vinod Grover and Thibaut Lutz, and filed May 15, 2014.

BACKGROUND OF THE INVENTION

In the field of computer programming, compilers are well known computer programs used to translate other sets of program instructions written in one programming language (typically a "high" or human-readable computer language) to another (typically a "low" or machine-readable computer language. Generally, the process through which a compiler generates computer executable code consists of three main stages. The first stage, also known as the frontend stage, performs the initial analysis (e.g., lexical, syntactical, and semantics) of the programmed instructions and generates an intermediate representation (IR) of the source code for further processing.

The next or middle stage performs optimizations on the resulting intermediate representation, typically simplifies the flow and eliminates useless portions of the code, as well as discovery and propagation of constant values. Often, the middle stage will generate and output a second IR for the third and final stage. The third and final stage, also known as the backend stage generates the computer-readable assembly code, and performs further optimizations and actions in preparation of code execution.

Since modern computer programs often contain huge amounts of programmed instructions, optimization during compilation to reduce execution time has become a large compelling interest. One type of optimization is known as inter-procedural optimization and involves analyzing the entirety of a program's source code, as opposed to limiting the analysis and resultant optimization to certain target regions or program constructs. Since a greater quantity of information can be analyzed for comparison (compared to targeted optimization techniques), the optimization as a whole can be more effective. However, for many programs, certain portions of the program's source code may use data (values) that are not known or available during compile, and only become so at run-time (execution). As such, static inter-procedural optimization for these programs may be less effective.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An aspect of the present invention proposes a solution for implementing staging in computer programs and code specialization at runtime. Even when values are not known at compile time, many of the values used as parameters for a code section or a function are constant, and are known prior to starting the computation of the algorithm. Embodiments of the claimed subject matter propagate these values just before execution in the same way a compiler would if they were compile time constant, resulting in improved control flow and significant simplification in the computation involved.

According to one aspect of the claimed subject matter, a method is provided for performing partial code specialization at runtime. According to one or more embodiments, the method may comprise retrieving a plurality of programmed instructions from a memory device, analyzing the plurality of programmed instructions to generate first an abstract syntax tree (AST) representation of the plurality of programmed instructions and a first intermediate representation based on the first syntax representation, identifying a function with a parameter in the plurality of programmed instructions from the first syntax representation, identifying a constant value corresponding to the parameter, generating a specialized version of the sequence of programmed instructions based on the constant value, and storing the specialized version.

According to another aspect of the claimed subject matter, a device is provided for performing partial code specialization at runtime. In one or more embodiments, the device may include a memory device with program instructions stored therein, and a processor communicatively coupled to the memory device and configured to retrieve the plurality of programmed instructions from the memory device, to analyze the plurality of programmed instructions to generate a first syntax representation of the plurality of programmed instructions and a first intermediate representation based on the first syntax representation, to identify a sequence of programmed instructions operable to perform a function with a parameter in the plurality of programmed instructions from the first syntax representation, to identify a constant value corresponding to the parameter, to generate a specialized version of the sequence of programmed instructions comprising a reference to the constant value based on the constant value, the specialized version comprising a reference to the constant value, and to store the specialized version. In one or more further embodiments, the processor is also configured to replace references to the parameter in the sequence of programmed instructions with the constant value when the plurality of programmed instructions is executed at run-time.

According to a further aspect of the claimed subject matter, computer readable media is described herein which, when executed by a processor, is operable to perform the method for performing partial specialization at runtime mentioned above and described in further detail below.

BRIEF DESCRIPTION OF THE DRAWINGS

The accompanying drawings are incorporated in and form a part of this specification. The drawings illustrate embodiments. Together with the description, the drawings serve to explain the principles of the embodiments:

FIG. 3 depicts a first set of exemplary programmed instructions in pseudo-code, in accordance with various embodiments of the present invention.

FIG. 4 depicts an intermediate representation of an exemplary portion of pseudo-code, in accordance with various embodiments of the present invention.

FIG. 5 depicts a second set of exemplary programmed instructions in pseudo-code, in accordance with various embodiments of the present invention.

DETAILED DESCRIPTION

Figure 1:
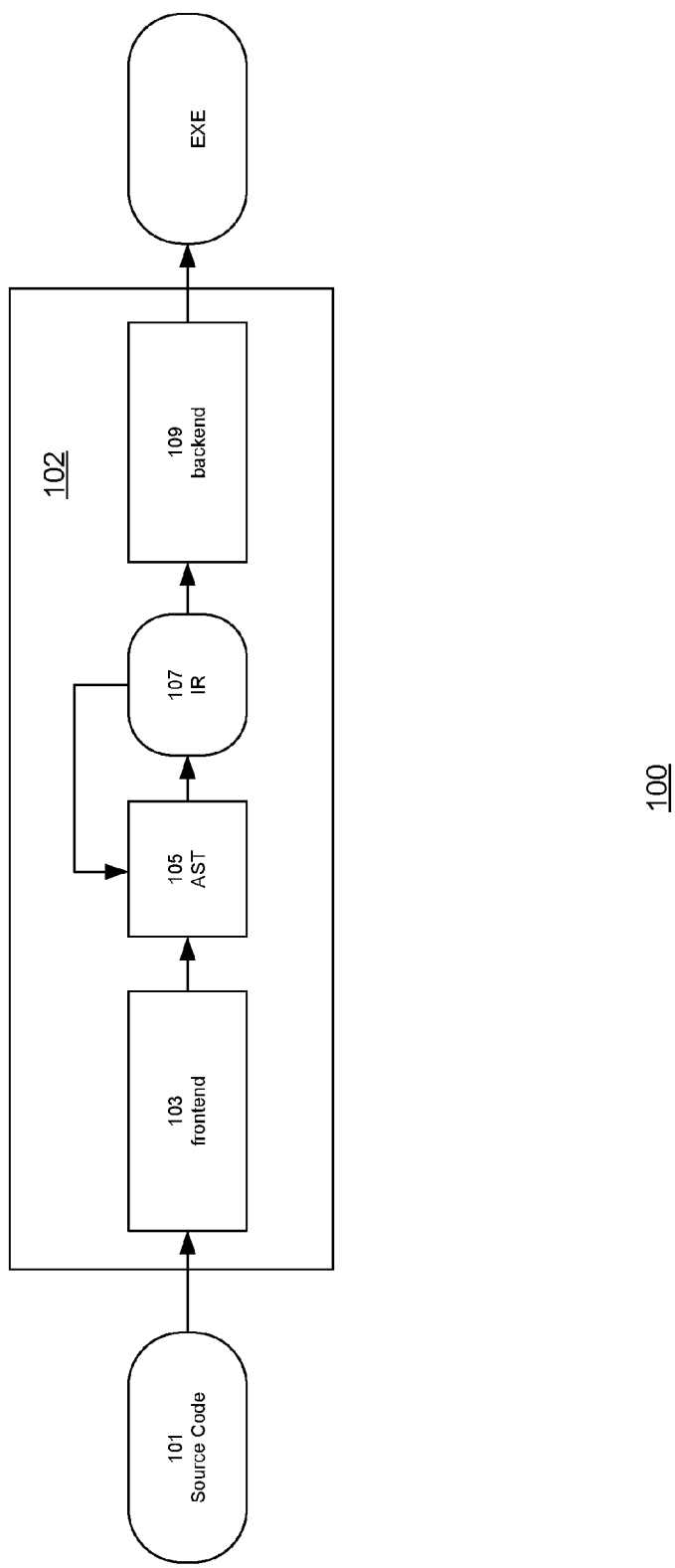
FIG. 1 depicts a data flow diagram of a compilation process, in accordance with various aspects of the present invention.

Reference will now be made in detail to the preferred embodiments of the claimed subject matter, a method and system for the use of a radiographic system, examples of which are illustrated in the accompanying drawings. While the claimed subject matter will be described in conjunction with the preferred embodiments, it will be understood that they are not intended to limit these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to obscure unnecessarily aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Embodiments of the claimed subject matter are presented to provide a technique for implementing compilation in stages in computer programs and code specialization at runtime. Embodiments of the claimed subject matter propagate dynamic values just before execution in the same way a compiler would if they were compile time constant, resulting in improved control flow and significant simplification in the computation involved.

Partial Specialization

According to one or more aspects of the claimed subject matter, a technique for performing partial specialization of compiled functions is provided. Specifically, the technique adds a new pass (pre-compile) to the compile process to inject the compiler generated Intermediate Representation (IR) of an input source code back in the executable. In one or more embodiments, the IR of the input source code may be generated either as a binary or a string representation. The new pass may be implemented as an additional pass in the compiler (typically the frontend). In one or more embodiments, a syntax representation (e.g., an abstract syntax tree) of the input source code may be generated during the frontend, and an intermediate representation may be generated from the syntax representation fragment. The resulting intermediate representation is re-compiled at a subsequent time (e.g., at runtime). The process is represented in the data flow diagram 100 of FIG. 1.

As depicted in FIG. 1, source code (101) is received in the compiler (102). Frontend (103) processes are performed on the input code during compilation. The frontend (103) processes may include, but are not limited to, lexical, syntax, and semantic analysis. In one or more embodiments, the syntax analysis can include parsing the input code and building a syntax representation from the source code. In one or more embodiments, the syntax representation may be a syntax tree, such as an abstract syntax tree (105), or "AST." The frontend (103) process also includes generating one or more intermediate representations (107) from the input code. In one or more embodiments, the intermediate representation (107) is generated from the syntax tree (105).

The backend (109) of the compiler performs an analysis of the IR (107) that was derived from the source code, along with optimizations for improving the source code's execution. The backend (109) may also perform code generation to translate the IR to the native code for the processing device performing the compilation. In one or more embodiments, the processing device may be implemented as, for example, a central processing unit (CPU), graphics processing unit (GPU), or microprocessor of a computing machine.

According to one or more embodiments, a library is provided with high level functions a user can use to request specialized versions of the functions. The API (in exemplary programming language C++) for the Specialize function is presented below in Table I:

TABLE I

```
template<typename Ret, typename ... Args>
   auto Specialize(Ret(*f)(Args...), Args ... args)
       -> std::function<Ret(Args...)>;
```

As depicted, this library uses the value of the function call parameters and replaces their load instructions in the IR with their value directly. At runtime, compiler optimizations passes are applied on the IR to simplify the control flow and eliminate unnecessary code. The resulting IR is just-in-time (JIT) compiled to native processor code and the runtime returns a function wrapper of the specialized code. In one or more embodiments, the prototype of the specialized version can be the same as the input function. In one or more further embodiments, scalar values will be ignored and the pointer values will be de-referenced on invocation.

To avoid undesired side effects, only the scalar values are expanded during compilation/specialization; pointers and references are not specialized again since their value might change between specialization and invocation. According to further embodiments, type aggregates are introspected to propagate the scalar fields and to ignore the pointers and references.

Figure 2:
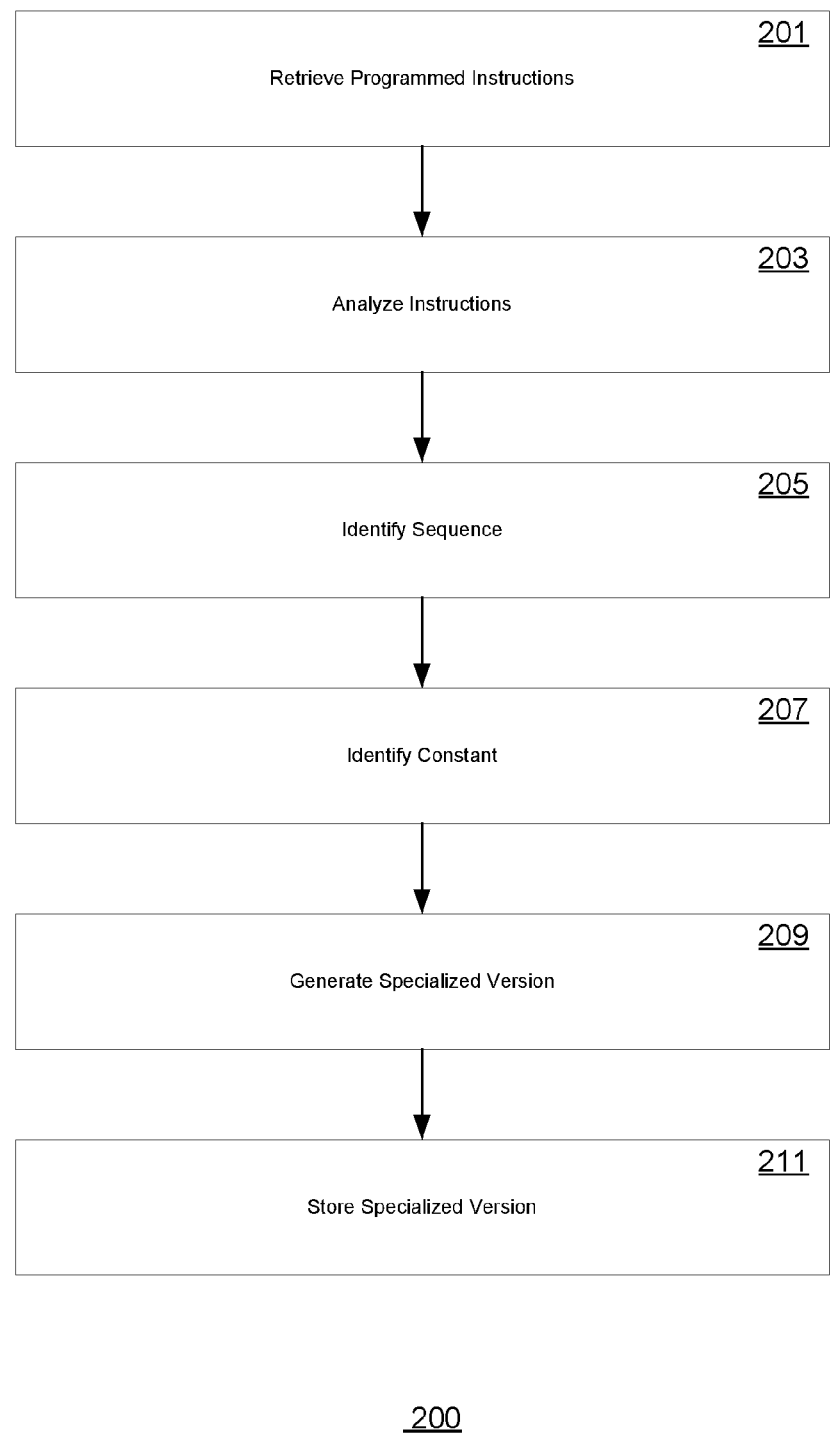
FIG. 2 depicts a flow chart an exemplary pre-compilation process, in accordance with various aspects of the present invention.

FIG. 2 depicts a flow chart of a pre-compilation process, in accordance with various aspects of the present invention. Steps 201-211 describe the steps comprising the process 200 depicted in the flowchart of FIG. 2. In one embodiment, the process 200 may be performed, in whole or in part, by a processor in a computing device or image processing system.

At step 201, programmed instructions are received by a compiler application executed by a processor. In one or more embodiments, the programmed instructions may comprise input or source code conforming to a programming language, such as C or C++. In one or more embodiments, the programmed instructions comprise a file including one or more sequences of programmed instructions which, when compiled and executed by a processor, are operable to perform functions that may include, but are not limited to, data computations. In still further embodiments, the data computations may be computations performed using additional data parameters.

At step 203, the programmed instructions are analyzed. Analysis of the programmed instructions may comprise, for example, lexical, syntax, and/or semantic analysis, including the generation of a syntax structure and/or an intermediate representation of the plurality of programmed instructions. In one or more embodiments, the syntax structure comprises a representation of the syntax, such as an abstract structure tree. Analysis of the programmed instructions also includes determining, via the syntax structure and/or the intermediate representation, identifying, at step 205, sequences of instructions contained in the programmed instructions that correspond to functions that include parameters identified as having a constant value. A constant value corresponding to one of the parameters is identified at step 207.

At step 209, the sequence of the programmed instructions corresponding to the function is specialized to create a specialized version of the function. In one or more embodiments, the sequence of programmed instructions is specialized by calling a specialize function that receives, as parameters, a reference to the sequence and the parameter with a constant value, inter alia. In one or more embodiments, the specialize function replaces load instructions for the parameter in the IR with the constant value directly, thereby eliminating the need to determine (and/or recompile) the parameter value subsequently during execution. The specialized functions are then stored at step 211. In one or more embodiments, the specialized functions may be stored in a processor cache.

In one or more embodiments, the (first) IR may be re-compiled, and used to generate a second syntax structure and second IR. In one or more embodiments, optimization of the second IR (via compiler optimization passes, for example) may be performed during runtime. The resulting IR after the compiler optimization is just-in-time compiled to the native code of the processor, and function calls for the function during runtime return the function wrapper of the specialized function.

FIG. 3 illustrates an exemplary portion 300 of pseudo-code for performing the partial specialization of a function. The values of function's parameters are not known at compile time but are initialized before calling the function foo. The function foo can be specialized by calling the Specialize function, which returns another function. The intermediate representation 400 for the specialized function in the exemplary portion 300 is presented in the exemplary of FIG. 4. As shown in FIG. 4, all of the control flow from the nested loops and computations have been reduced to the constant value 36.

As depicted in IR 400, the value of the pointer has not been propagated. Instead; the IR loads the value and dereferences it, and returns the resulting value plus the constant noted above. The original IR for the function foo may contain significantly more instructions, but may be eliminated by the specialization.

Applications

Instead of asking the user to explicitly specialize a function, this technique can be applied to lambda functions in C++ or any language that supports lambdas. Lambda functions are a feature in C++ that allow users to capture variables from the scope during which it is declared. Data can be either captured by reference, which means they are handled as a reference on the local variables, or by copy, which creates a copy of the local variable in the state they were at when the lambda was instantiated.

Captured data is implicitly declared constant, unless the lambda function is explicitly qualified as mutable. Hence the value of the data captured by copy will not change after instantiation, a particular feature that is leveraged during specialization. However, values captured by reference and values obtained by de-referencing a pointer might change between instantiation and invocation; so they are ignored during the specialization.

In addition to captured data, lambda expression can also take parameters, for which the value depends on the invocation of the lambda instance. These parameters provide a natural way for the user to distinguish between constant and dynamic values in the body of the lambda. In one or more embodiments, constants are captured and all dynamic values are passed as parameters.

FIG. 5 shows an exemplary portion 500 of a pseudo code for a program using a lambda function. The resulting behavior is very similar to the function foo depicted in FIG. 3, except that the process takes an additional parameter (int x). Although the parameter is passed by value, it belongs to the argument list and not the captured list, so it is ignored by the specialization function. The IR for this lambda is similar to the one in FIG. 4, with an additional add instruction for the parameter. The Loops are simplified in the same way and the pointer contained inside the structured captured by value is not propagated.

Exemplary Computing System

Figure 6:
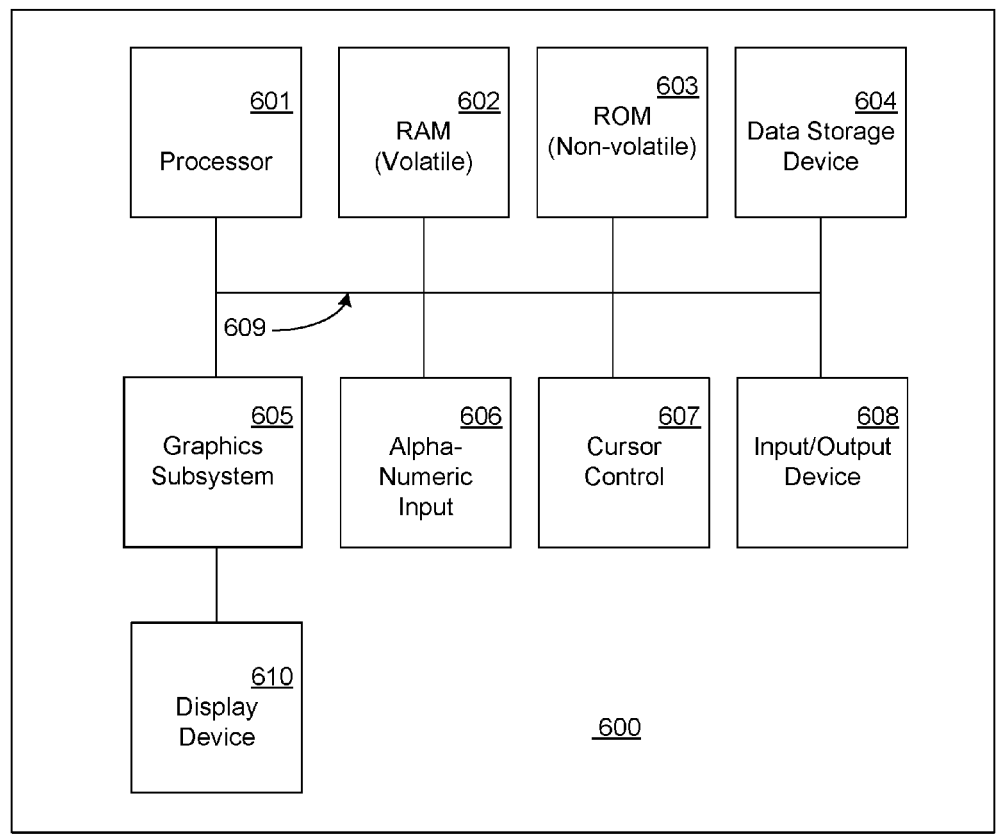
FIG. 6 depicts an exemplary computing environment upon which embodiments of the claimed subject matter may be executed, in accordance with various embodiments of the present invention.

As presented in FIG. 6, an exemplary system 600 upon which embodiments of the present invention may be implemented includes a general purpose mobile computing system environment. In its most basic configuration, computing system 600 typically includes at least one processing unit 601 and memory, and an address/data bus 609 (or other interface) for communicating information. Depending on the exact configuration and type of computing system environment, memory may be volatile (such as RAM 602), non-volatile (such as ROM 603, flash memory, etc.) or some combination of the two.

Computer system 600 may also comprise an optional graphics subsystem 605 for presenting information to the computer user, e.g., by displaying information on an attached display device 610. In one embodiment, the processing and image enhancement of the image data received may be performed, in whole or in part, by graphics subsystem 605 in conjunction with the processor 601 and memory 602, with any resulting output displayed in attached display device 610.

Additionally, computing system 600 may also have additional features/functionality. For example, computing system 600 may also include additional storage (removable and/or non-removable) including, but not limited to, magnetic or optical disks or tape. Such additional storage is illustrated in FIG. 6 by data storage device 604. Computer storage media includes volatile and nonvolatile, removable and non-removable media implemented in any method or technology for storage of information such as computer readable instructions, data structures, program modules or other data. RAM 602, ROM 603, and data storage device 604 are all examples of computer storage media.

Computer system 600 also comprises an optional alphanumeric input device 606, an optional cursor control or directing device 607, and one or more signal communication interfaces (input/output devices, e.g., a network interface card) 608. Optional alphanumeric input device 606 can communicate information and command selections to central processor 601. Optional cursor control or directing device 607 is coupled to bus 609 for communicating user input information and command selections to central processor 601. Signal communication interface (input/output device) 608, also coupled to bus 609, can be a serial port. Communication interface 608 may also include wireless communication mechanisms. Using communication interface 608, computer system 600 can be communicatively coupled to other computer systems over a communication network such as the Internet or an intranet (e.g., a local area network), or can receive data (e.g., a digital television signal).

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method for performing partial code specialization at runtime, the method comprising:
    retrieving, from a memory device, a plurality of programmed instructions;
    analyzing the plurality of programmed instructions to generate a first syntax representation of the plurality of programmed instructions and a first intermediate representation based on the first syntax representation;
    identifying a sequence of programmed instructions comprised in the plurality of programmed instructions from the first syntax representation, the sequence of programmed instructions being configured to, when executed, perform a function with a parameter;
    identifying a constant value corresponding to the parameter;
    generating, at runtime, a specialized version of the sequence of programmed instructions based on the constant value, the specialized version comprising a reference to the constant value; and
    storing the specialized version,
    wherein references to the parameter in the sequence of programmed instructions are directly replaced by the constant value in the specialized version.

2. The method according to claim 1, wherein the syntax representation comprises an abstract syntax tree.

3. The method according to claim 1, further comprising:
    compiling the plurality of programmed instructions; and
    executing the plurality of programmed instructions.

4. The method according to claim 3, wherein the compiling the plurality of programmed instructions comprises:
    generating a second syntax tree from the first intermediate representation; and
    generating a second intermediate representation based on the second syntax tree.

5. The method according to claim 4, wherein the executing the plurality of programmed instructions comprises optimizing the second intermediate representation for execution.

6. The method according to claim 5, wherein the optimizing the second intermediate representation comprises applying a compiler optimization pass to the second intermediate representation to generate an optimized intermediate representation.

7. The method according to claim 6, wherein the compiling the programmed instructions comprises just-in-time (JIT) compiling the optimized intermediate representation.

8. The method according to claim 7, wherein JIT compiling the optimized intermediate representation comprises compiling the optimized intermediate representation to native code corresponding to a processor.

9. The method according to claim 8, wherein the processor is comprised from the group of processors consisting of:
    a central processing unit (CPU);
    a microprocessor; and
    a graphics processing unit (GPU).

10. The method according to claim 9, wherein storing the specialized version comprises storing the specialized version in a processor cache.

11. The method according to claim 4, wherein the first intermediate representation comprises at least one representation from the group of representations consisting of:
    a binary representation; and
    a string representation.

12. A device for performing partial code specialization at runtime, the device comprising: a memory device for storing a plurality of programmed instructions; and a processor, communicatively coupled to the memory device and configured to:
    retrieve the plurality of programmed instructions from the memory device, analyze the plurality of programmed instructions to generate a first syntax representation of the plurality of programmed instructions and a first intermediate representation based on the first syntax representation, identify a sequence of programmed instructions configured to perform a function with a parameter in the plurality of programmed instructions from the first syntax representation, identify a constant value corresponding to the parameter, generate, at runtime, a specialized version of the sequence of programmed instructions based on the constant value, the specialized version comprising a reference to the constant value, and store the specialized version, wherein references to the parameter in the sequence of programmed instructions are directly replaced by the constant value in the specialized version of the sequence of programmed instructions.

13. The device according to claim 12, wherein the processor is comprised from the group of processors consisting of:
   a central processing unit (CPU);
   a microprocessor; and
   a graphics processing unit (GPU).

14. The device according to claim 13, wherein the processor comprises a cache.

15. The device according to claim 14, wherein the processor is configured to store the specialized version in the cache.

16. A non-transitory computer readable medium with programmed instructions embodied therein for performing partial code specialization at runtime, the programmed instructions comprising:
   instructions to retrieve, from a memory device, a plurality of programmed instructions;
   instructions to analyze the plurality of programmed instructions to generate a first syntax representation of the plurality of programmed instructions and a first intermediate representation based on the first syntax representation;
   instructions to identify a sequence of programmed instructions comprised in the plurality of programmed instructions from the first syntax representation, the sequence of programmed instructions being configured to, when executed, perform a function with a parameter;
   instructions to identify a constant value corresponding to the parameter;
   instructions to generate, at runtime, a specialized version of the sequence of programmed instructions based on the constant value, the specialized version comprising a reference to the constant value; and
   instructions to store the specialized version, wherein references to the parameter in the sequence of programmed instructions are directly replaced by the constant value in the specialized version of the sequence of programmed instructions.

17. The non-transitory computer readable medium according to claim 16, further comprising:
   instructions to compile the plurality of programmed instructions; and
   instructions to execute the plurality of programmed instructions.

18. The non-transitory computer readable medium according to claim 17, wherein the instructions to compile the plurality of programmed instructions comprises:
   instructions to generate a second syntax tree from the first intermediate representation; and
   instructions to generate a second intermediate representation based on the second syntax tree.

19. The non-transitory computer readable medium according to claim 18, wherein the instructions to execute the plurality of programmed instructions comprises instructions to optimize the second intermediate representation for execution.

20. The non-transitory computer readable medium according to claim 19, wherein the instructions to optimize the second intermediate representation comprises instructions to apply a compiler optimization pass to the second intermediate representation to generate an optimized intermediate representation.

* * * * *